April 17, 1945.  C. N. CROSS  2,373,873
PICTURE SUPPORT
Filed April 2, 1942  2 Sheets-Sheet 1
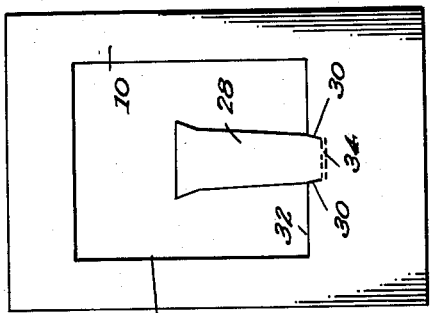
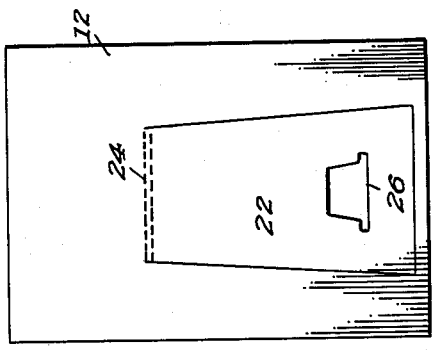
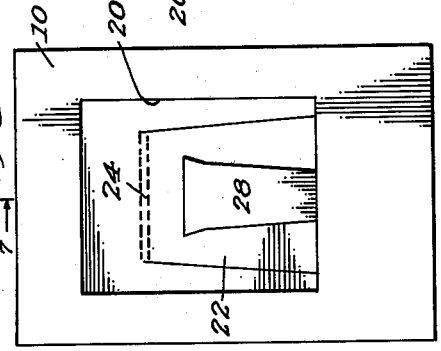
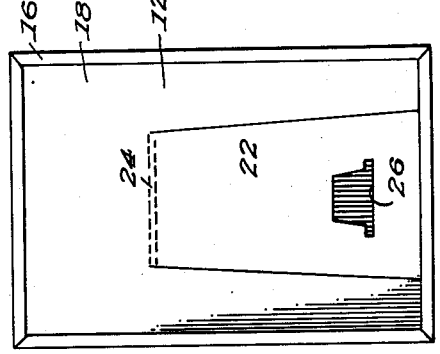
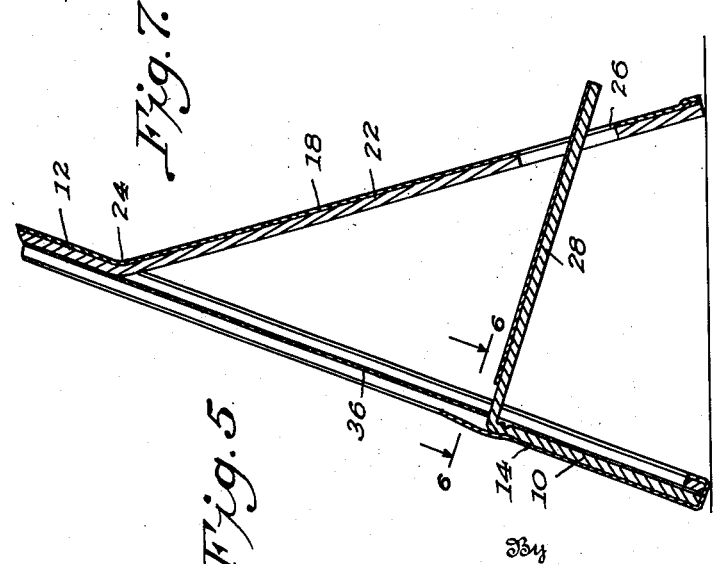
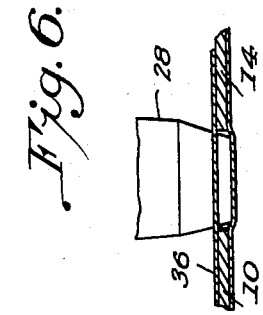
Inventor
CARROLL N. CROSS
By
Attorney April 17, 1945.   C. N. CROSS   2,373,873
PICTURE SUPPORT
Filed April 2, 1942   2 Sheets-Sheet 2
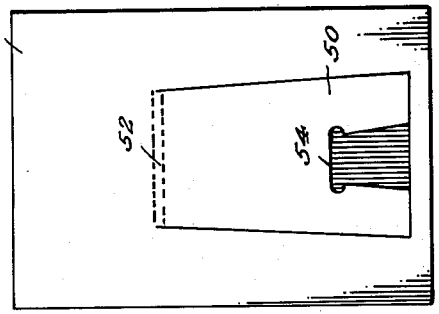
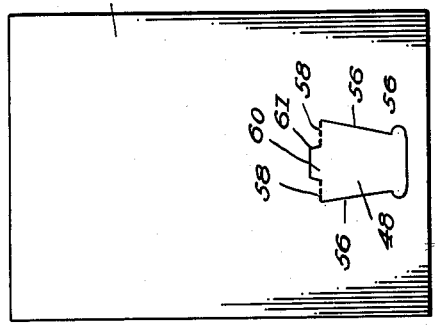
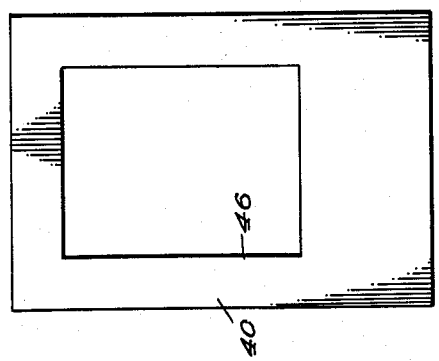
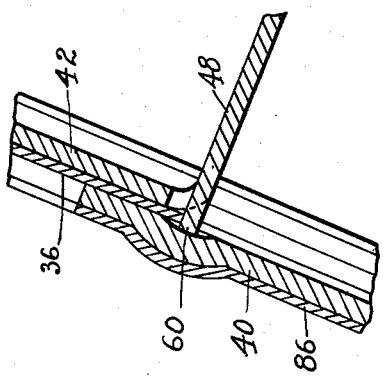
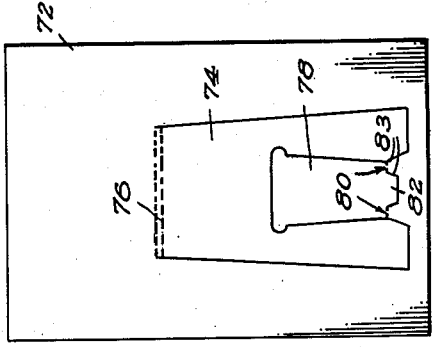
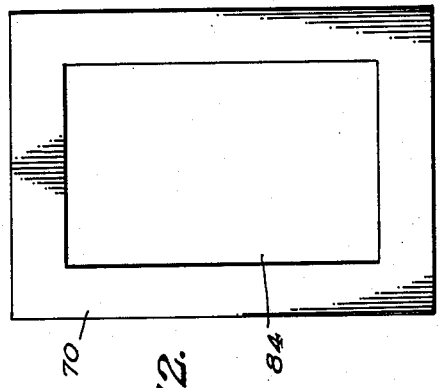
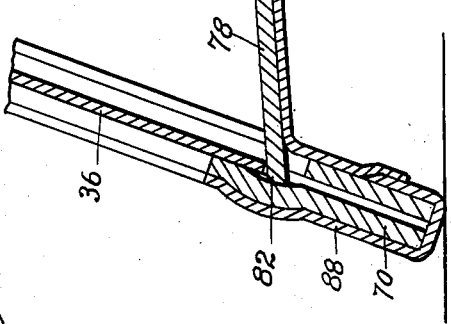
Inventor
CARROLL N. CROSS
Attorney Patented Apr. 17, 1945

2,373,873

UNITED STATES PATENT OFFICE 2,373,873

PICTURE SUPPORT

Carroll N. Cross, Middleboro, Mass.

Application April 2, 1942, Serial No. 437,451

4 Claims. (Cl. 40—152.1)

This invention relates to display mounts adapted for the display of photographs, pictures and other indicia, hereinafter generally designated as picture.

More particularly, the invention relates to a mount of this general character wherein there is provided effective means for holding a picture or the like while the mount is in display position.

Particularly, the invention relates to the provision of support means for a picture or the like within a mount of this character associated with an easel locking tongue constructed in such fashion that the holding means becomes operative automatically upon placing the mount in display position.

Heretofore mounts for pictures or the like have been provided with recessed well boards intermediate their face board and back boards wherein there has been provided a cut-out portion of such size and shape as to embrace the marginal edges of a picture. These well boards have been effective to hold the picture or the like in position under the display window. However, in constructions of a less expensive nature wherein the well boards have been omitted it was found that a picture loosely inserted in such mounts would soon slide out of position toward the bottom of the mount thereby rendering such constructions less satisfactory.

The present invention has been designed to avoid these objections and the particular manner in which the objects of the invention are accomplished will become apparent as a description of the devices proceeds in light of the attached drawings in which like reference numerals indicate like parts and in which:

Figure 1 is a facial view of a face board comprising an element in the first embodiment of the mount constituting the invention;

Figure 2 is a rear view of a back board comprising an element of the first form of the invention;

Figure 3 is a facial view of the elements of Figures 1 and 2 in assembled relation;

Figure 4 is a rear view of the assembly shown in Figure 3;

Figure 5 is a fragmentary sectional view taken along a medial longitudinal line of the mount of the first form to illustrate the same in open or picture supporting position;

Figure 6 is a detail sectional view on lines 6—6 of Figure 5;

Figure 7 is a longitudinal sectional view taken on line 7—7 of Figure 3;

Figure 8 is a facial view of a face board comprising an element in a second form of the invention;

Figure 9 is a rear view of an intermediate board comprising an element of the second form of the invention;

Figure 10 is a rear view of a back board comprising an element of the second form of the invention;

Figure 11 is a fragmentary sectional view taken along medial longitudinal line of the mount of the second form to illustrate the same in open or picture supporting position;

Figure 12 is a fragmentary sectional view taken along a medial longitudinal line of the third form to illustrate the same in open or picture supporting position;

Figure 13 is a facial view of a face board comprising an element of the third form of the invention; and Figure 14 is a rear view of a back board comprising an element of the third form of the invention.

The embodiment of the invention shown in Figures 1 to 7, inclusive, consists of a picture-holding body consisting of a face board 10 and a back board 12 which are preferably substantially coextensive throughout the marginal edges and which are joined together into a unitary structure.

In the preferred form of the invention the face board 10 and the back board 12 are joined about their marginal edges by means of a decorative flexible covering material 14 which is attached to and extends over the face board, around the marginal edges of the face board and the back board and whose marginal edges 16 terminate on and are attached to the back board 12. A separate section of material 18 may be used to cover the exposed surface of the back board 12 and in this event the same is made of such size as to overlie the exposed edges 16 of the facial material 14.

The face board 10 has formed therein a picture display window 20 and the back board 12 has formed therein a mount supporting easel 22.

The mount supporting easel 22 is associated with the back board for angular movement into and out of mount supporting position and herein the easel is shown as consisting of a section severed from the back board along three sides thereof but being attached thereto along one or more score lines 24 which permit the angular movement thereof. The easel 22 is provided with a passage 26 which is adapted to engage an easel locking tongue as hereinafter to be described.

The face board 10 has formed therein an easel locking tongue 28 which in the illustrated embodiment appears as a projection extending upwardly from the lower margin of the picture display window 20. The locking tongue 28 is severed from the face board 10 along lines 30 which extend downwardly from the lower margin 32 of the picture display window 20. The tongue 28 is adapted for angular movement about the score lines 34 at the base thereof.

As a consequence of this construction, it will be seen that when a picture 36 is placed into the mount and the easel 22 and the locking tongue 28 are moved angularly about their score lines 24 and 34, respectively, to a mount supporting position at the rear of the same as shown in Figure 5, the picture 36 is held against gravitation toward the bottom of the mount by abutment of the bottom edge thereof with the locking tongue 28 as shown in Figure 5 and more particularly indicated in Figure 6.

In that embodiment of the invention illustrated in Figures 8 to 11, inclusive, the same is shown as being applied to a construction using three substantially coextensive board members consisting of a face board 40, an intermediate board 42, and a back board 44; the face board 40 having a display window 46 therein, the intermediate board 42 having an easel locking tongue 48 therein and the back board 44 having a mount supporting easel 50 therein.

In this form of the construction the easel 50 is similar to that shown in the first embodiment of the invention in that the same is formed in the back board 44 by severing the same along three sides defining the easel and by providing score lines 52 permitting the same to be moved angularly thereabout to bring the easel into mount supporting position. In Figure 10 the easel passage 54 with which the locking tongue 48 is adapted to engage is shown as extending throughout the bottom edge of the easel.

The primary difference in the construction shown in Figures 8 to 11, inclusive, lies in the construction of the locking tongue 48. The tongue is formed by severing the intermediate board 42 along lines 56 whereby the locking tongue 48 may be moved angularly into easel locking position on a pair of aligned interrupted score lines 58.

In order to provide a picture-holding means, a portion 60 of the locking tongue 48 is severed from the intermediate board 42 at a point beyond the score lines 58 by means of a more or less U-shaped incision 61, the legs of which intersect the inner ends of the score lines 58 thereby defining the portion 60 which projects across the normal plane of a picture 36 within the mount when the locking tongue 48 has been moved angularly about the score lines 58 to engage the passage 54 in the easel 50 when the latter is moved into mount supporting position at the rear of the mount as shown in Figure 11.

Figures 12 to 14, inclusive, show a still further embodiment of the invention wherein the same is adapted to a mount constructed of a face board 70 and a back board 72. This construction utilizes an easel locking tongue quite similar to that shown in Figure 9 but differing primarily therefrom in that it is modified to permit its association with the back board 72.

The back board 72 has formed therein an easel member 74 which is severed from the back board along three of its sides but which is attached thereto by one or more score lines 76 about which the same may be moved angularly into mount supporting position. The locking tongue 78 is formed in the body of the easel 74 by severing it from the easel along the lines constituting its free edges. The locking tongue 78 is attached to the back board 72 at its base but is provided with aligned interrupted score lines 80 about which the same may be moved rearwardly into easel locking position. A projecting portion 82 at the base of the locking tongue 78 is adapted to intersect the normal facial plane of a picture 36 held within the mount as more particularly shown in Figure 12. By this construction the picture 36 is securely held in proper position under the display window 84 formed in the face board 70. The projection 82 is defined by a substantially U-shaped incision 83, the legs of which intersect the inner ends of the score lines 80.

It is obvious that in this form of the construction the easel 74 may be moved rearwardly and the locking tongue 78 may be moved to a rearwardly inclined position wherein the easel 74 will straddle the same as shown in Figure 12. Because of the diverging lines defining the sides of the locking tongue 78, the position thereof relative to the easel 74 may be adjusted to secure a firm frictional engagement between the two. It will be observed that the easel locking tongues in the two embodiments of the invention shown in Figures 1 to 11 are also cut along divergent lines which permit a tight frictional adjustment with their respective easels.

The parts comprising the mounts shown in Figures 8 to 14, inclusive, may be yieldingly held together in a fashion similar to that described with respect to the embodiment of the invention shown in Figures 1 through 7, i. e., by the use of a decorative binding material designated generally at 86 and 88 in the respective forms. Furthermore, while no particular means has been shown whereby a picture may be inserted, it will be understood that the same may be encased with the mount at the time of its manufacture as a permanent part thereof, or the mount may have provided any conventional picture inserting passage through which a picture may be inserted or removed at will.

The invention is subject to change in the details of its construction and it is desired that its practice be not limited other than by the limitations imposed by the subjoined claims.

I claim:

1. In a picture mount or the like adapted to support a picture in display position, a board constituting the body of said mount and being adapted to support a picture on the face thereof, an easel attached to said body and being adapted for angular movement into and out of mount supporting position, an easel locking tongue adapted to be disposed between said body and said easel in its mount supporting position, said tongue being formed in said board and having one of its ends attached thereto, a portion of said tongue being formed as a projection beyond its point of attachment with said board that in its easel locking position extends across the normal facial plane of a picture supported by the facial surface of said board and into supporting and abutting position for the bottom edge of a picture therein.

2. In a picture mount or the like adapted to support a picture in display position, a board constituting a support for a picture or the like, an easel formed in the body of said board and being adapted for angular movement to the rear of said board whereby the same may be moved to mount supporting position, an easel locking tongue formed in said board and being adapted to engage said easel in its mount supporting position, said tongue having one end thereof attached to said board and having a projection beyond its attached end that in its easel locking position extends across the normal facial plane of a picture supported by said board and into supporting and abutting position for the bottom edge of a picture thereon.

3. In a picture mount or the like adapted to support a picture in display position, a back board constituting a support for a picture, an easel formed in the body of said board and being adapted for angular movement into and out of mount supporting position, a face board having a picture window therein superimposed on said back board, an easel locking tongue formed in said back board adapted to engage said easel in its mount supporting position, said tongue having an end attached to said back board, and a projection formed beyond said attached end that in its easel locking position extends across the normal facial plane of a picture supported by said back board and into supporting and abutting position for the bottom edge of a picture therein.

4. In a picture mount or the like adapted to support a picture in display position, a back board and a face board joined together along common bottom edges thereof, an easel formed in said back board, said easel having a line at its upper end about which the same may move angularly and having a free lower end located inwardly of the bottom edge of said board, an easel locking tongue formed in the body of said easel, said locking tongue having a free upper end and a transverse line spaced inwardly of the bottom edge of said back board at the lower end of said tongue at which line said tongue is attached to said board and about which the tongue may move angularly, said easel and locking tongue being adapted to engage each other in mount supporting position and being adapted to lie wholly in the plane of said back board when in inoperative position.

CARROLL N. CROSS.